(12) United States Patent
Li

(10) Patent No.: US 9,083,427 B2
(45) Date of Patent: Jul. 14, 2015

(54) TRANSCEIVER AND COMMUNICATION METHOD OF DIGITAL SUBSCRIBER LINE

(71) Applicant: REALTEK SEMICONDUCTOR CORPORATION, Hsinchu (TW)

(72) Inventor: Cheng-Hsien Li, Tainan (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/189,613

(22) Filed: Feb. 25, 2014

(65) Prior Publication Data

US 2014/0241405 A1  Aug. 28, 2014

(30) Foreign Application Priority Data

Feb. 27, 2013  (TW) .............. 102107077 A

(51) Int. Cl.
*H04B 3/20* (2006.01)
(52) U.S. Cl.
CPC ....................... *H04B 3/20* (2013.01)
(58) Field of Classification Search
CPC ........................................................ H04B 3/20
USPC ................................................. 375/219, 222
See application file for complete search history.

(56) References Cited

U.S. PATENT DOCUMENTS 7,061,987 B1 *  6/2006  Tan et al. ...................... 375/260
7,068,780 B1 *  6/2006  Levonas et al. ......... 379/406.08
2002/0176569 A1 * 11/2002  Casier et al. .................. 379/402
2004/0213170 A1 * 10/2004  Bremer ......................... 370/282
2006/0222173 A1 * 10/2006  Lin et al. ................. 379/406.08

FOREIGN PATENT DOCUMENTS

CN         101110873 A       1/2008
TW            468311         12/2001

OTHER PUBLICATIONS

Office action and Search Report dated Jan. 23, 2015 from the Taiwan counterpart application 102107077.
English abstract translation of the Office action dated Jan. 23, 2015 from the Taiwan counterpart application 102107077.
English abstract translation of CN 101110873A.
English abstract translation of TW 468311.

* cited by examiner

*Primary Examiner* — Michael Neff
(74) *Attorney, Agent, or Firm* — WPAT, P.C.; Anthony King

(57) ABSTRACT

The present invention discloses a transceiver of digital subscriber line (DSL) which supports a variety of DSL systems, comprising: a transmission circuit for receiving an output signal and generating a first DSL transmission signal or a second DSL transmission signal according to the output signal under the control of a transmission selection parameter; a hybrid circuit for generating a line transmission signal according to the first or second DSL transmission signal and generating a DSL reception signal according to a line reception signal; and a reception circuit for generating a first DSL reception signal or a second DSL reception signal according to the DSL reception signal, and then outputting one of the first and second DSL reception signals as an input signal according to a reception selection parameter.

17 Claims, 4 Drawing Sheets

US 9,083,427 B2

TRANSCEIVER AND COMMUNICATION METHOD OF DIGITAL SUBSCRIBER LINE

BACKGROUND OF THE INVENTION

1. Field of the Invention

The present invention relates to a transceiver and communication method of digital subscriber line, especially to a transceiver and communication method supporting a variety of digital subscriber line systems.

2. Description of Related Art

Digital subscriber line (DSL) system is a popular option for users to access internet, which uses the present telecommunication line to achieve the purpose of accessing broadband network. DSL system mainly includes an asymmetric digital subscriber line (ADSL) system and a very-high-data-rate digital subscriber line (VDSL) system, and the transceiver thereof adopts full-duplex transmission to allow users using a pair of telecommunication lines to transmit and receive signals at the same time, so as to fulfill the purpose of accessing broadband network. The hybrid circuit of said transceiver is a circuit design capable of satisfying full-duplex transmission in DSL system, which mainly uses a four-to-two circuit to transmit and receive signal simultaneously through a twisted pair, and thereby accomplishes effective transmission. In the view of customer premises equipment (CPE), the transmission (a.k.a. upstream) means the communication from a client end to a central office (CO) end while the reception (a.k.a. downstream) means the communication from a central office end to a client end.

Some prior arts about DSL system can be found in the US patents (U.S. Pat. Nos. 5,822,426; 6,163,579; 6,931,122; 7,072,464; 7,127,062; 7,170,927; 7,031,378; 7,106,854; 8,045,702) and US patent applications (publication number: 20110044415; 20090122845). However, the transceiver of these prior arts has at least one of the following problems: a single transceiver is not enough to support a variety of DSL systems, which makes applications inflexible and leads to higher cost; echo cancellation could not be carried out in light of transmission loop distance and DSL types, which leads to worse echo cancellation performance; echo noise escaping from the hybrid circuit could not be eliminated thereafter, which makes a reception end suffer the inter symbol interference (ISI) of said echo noise and leads to the reduction of signal-to-noise (SNR) ratio.

Therefore, the present DSL transceiver is not good enough, which means that this technical field needs a transceiver capable of supporting a variety of DSL systems and carrying out echo cancellation according to the transmission environment adaptively.

SUMMARY OF THE INVENTION

In light of the above, a purpose of the present invention is to provide a transceiver of digital subscriber line (DSL) and a communication method of DSL for the improvement of the prior arts.

The present invention discloses a transceiver of DSL capable of supporting a variety of DSL systems. An embodiment of said transceiver comprises: a transmission circuit, a hybrid circuit and a reception circuit. The transmission circuit includes: a transmission selector to receive an output signal and provide the output signal for a first DSL analog-front-end transmission circuit or a second DSL analog-front-end transmission circuit according to a transmission selection parameter; the first DSL analog-front-end transmission circuit corresponding to a first DSL system to generate a first DSL transmission signal according to the output signal; and the second DSL analog-front-end transmission circuit corresponding to a second DSL system to generate a second DSL transmission signal according to the output signal. The hybrid circuit is coupled with the transmission circuit to generate a line transmission signal according to the first DSL transmission signal or the second DSL transmission signal, and to generate a DSL reception signal according to a line reception signal. The reception circuit is coupled with the hybrid circuit, including: a first DSL analog-front-end reception circuit corresponding to the first DSL system to generate a first DSL reception signal according to the DSL reception signal; a second DSL analog-front-end reception circuit corresponding to the second DSL system to generate a second DSL reception signal according to the DSL reception signal; and a reception selector to output the first DSL reception signal or the second DSL reception signal as an input signal according to a reception selection parameter.

According to another embodiment of the present invention, said transceiver comprises: a transmission circuit to generate a first DSL transmission signal or a second DSL transmission signal according to an output signal; a reception circuit to generate a first DSL reception signal or a second DSL reception signal according to a DSL reception signal, and output the first or second DSL reception signal as an input signal; and a hybrid circuit which is coupled with the transmission circuit and the reception circuit to generate a line transmission signal according to the first or second DSL transmission signal and generate the DSL reception signal according to a line reception signal. In this embodiment, the hybrid circuit comprises: a first echo canceller to carry out a first echo cancellation on the line reception signal; and a second echo canceller to carry out a first DSL echo cancellation or a second DSL echo cancellation on the line reception signal according to a present DSL type, and/or carry out a second echo cancellation on the line reception signal according to a line impedance detection result or an echo cancellation amount estimation result.

The present invention also discloses a communication method of DSL capable of supporting a variety of DSL systems and being carried out by the DSL transceiver of the present invention or its equivalent. An embodiment of said method comprises the following steps: generating a first DSL transmission signal according to an output signal if a transmission selection parameter indicates a first DSL system, and generating a second DSL transmission signal according to the output signal if the transmission selection parameter indicates a second DSL system; generating a line transmission signal according to the first or second DSL transmission signal; receiving a line reception signal and carrying out a constant first echo cancellation on the line reception signal to thereby generate a first echo cancellation signal; carrying out a first DSL echo cancellation or a second DSL echo cancellation on the line reception signal according to a present DSL type and/or carrying out a second echo cancellation on the line reception signal according to a line impedance detection result or an echo cancellation amount estimation result, so as to generate a second echo cancellation signal; generating a DSL reception signal according to the first and second echo cancellation signals; and generating a first DSL reception signal or a second DSL reception signal according to the DSL reception signal, and outputting the first or second DSL reception signal as an input signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
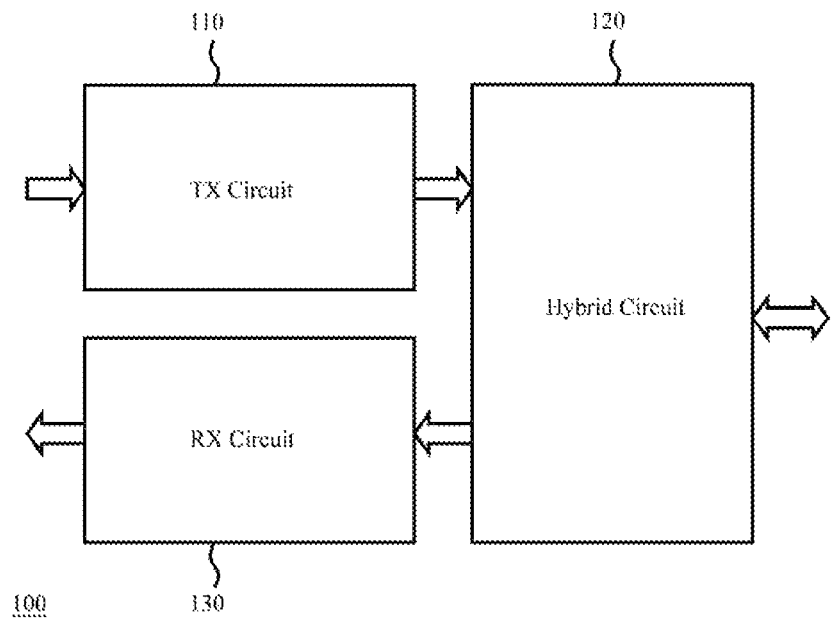
FIG. 1 illustrates an embodiment of the DSL transceiver of the present invention.

The following description uses language by referring to terms in the field of this invention. If any term is defined in the specification, such term should be explained accordingly. Besides, the connection between objects or events in the disclosed embodiments can be direct or indirect provided that these embodiments are still applicable under such connection. Said "indirect" means that an intermediate object or a physical space is existed between the objects, or an intermediate event or a time interval is existed between the events. Furthermore, this invention relates to a transceiver and communication method of digital subscriber line (DSL), and thus the known detail in this field will be omitted if such detail has little to do with the features of the present invention. Moreover, the shape, size, and scale of any element and the step sequence of any flow chart in the disclosed figures are just exemplary for understanding, not for limiting the scope of the present invention.

Additionally, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility in carrying out the present invention.

The present invention contains a DSL transceiver and a DSL communication method. Said transceiver and method are capable of supporting a variety of DSL systems and executing echo cancellation in light of the transmission environment adaptively, which thereby achieves the purpose of flexible applications and performance improvement of echo cancellation. The variety of DSL systems includes at least an ADSL (Asymmetric digital subscriber line) system and a VDSL (very-high-data-rate digital subscriber line) system. Please note that although this specification gives sufficient embodiments, people of ordinary skill in the art can still choose components or steps equivalent to those described in this specification to carry out the present invention, which means that the scope of this invention is not limited to the embodiments in the specification. Besides, since some element by itself of the DSL transceiver of the present invention could be known, the detail of such element will be omitted provided that the omission nowhere dissatisfies the disclosure and enablement requirements. Similarly, since the DSL communication method of the present invention can be carried out by the device of the present invention or the equivalent thereof, the following description will abridge the hardware details related to the method provided that the remained disclosure is enough for understanding and enablement.

Please refer to FIG. 1 which illustrates an embodiment of the DSL transceiver of the present invention. This embodiment supports a variety of DSL systems such as an ADSL system and a VDSL system. As shown in FIG. 1, the transceiver 100 of the present embodiment comprises: a transmission circuit (TX Circuit) 110 to generate a first DSL transmission signal (e.g. an ADSL transmission signal) or a second DSL transmission signal (e.g. a VDSL transmission signal) according to an output signal; a hybrid circuit 120 to generate a line transmission signal according to the first or second DSL transmission signal, and to generate a DSL reception signal according to a line reception signal; and a reception circuit (RX Circuit) 130 to generate a first DSL reception signal (e.g. an ADSL reception signal) or a second DSL reception signal (e.g. a VDSL reception signal) according to the above-mentioned DSL reception signal, and then output the first or second DSL reception signal as an input signal. In the present embodiment, the hybrid circuit 120 not only uses a passive component to carry out constant echo cancellation, but also uses an active component to carry out adaptive echo cancellation. Said passive component could be a configuration including a constant impedance and a passive filter; and said active component could be a filtering circuit capable of carrying out echo cancellation according to the type of the present DSL system and/or the line impedance. However, people of ordinary skill in the art can still chooses any known elements and/or appropriate configurations for echo cancellation in light of the disclosure of the present invention.

Figure 2:
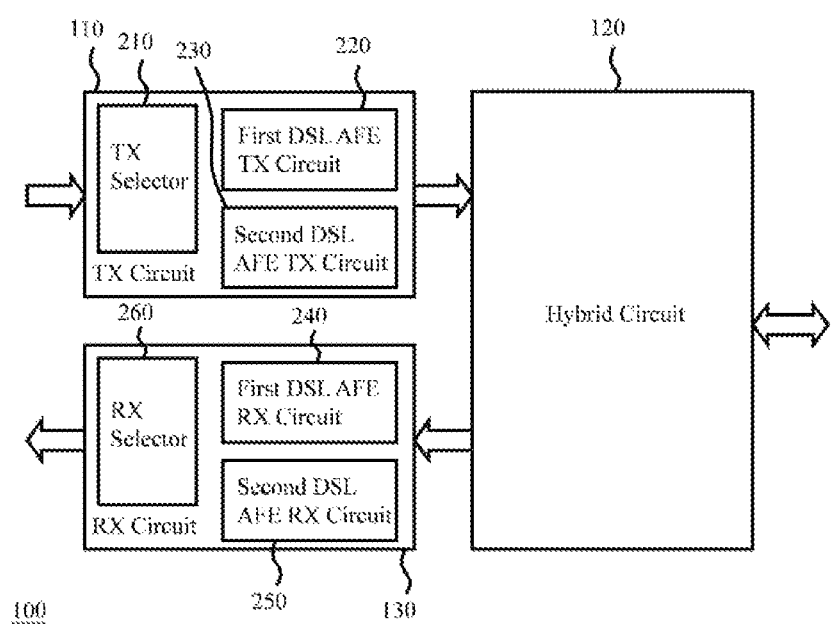
FIG. 2 illustrates the implementation detail of the transmission circuit and the reception circuit of FIG. 1.

Please refer to FIG. 2 which illustrates the implementation detail of the transmission circuit 110 and the reception circuit 130 of FIG. 1. As shown in FIG. 2, the transmission circuit 110 includes: a transmission selector (TX Selector) 210 to receive the aforementioned output signal and send the output signal to a first DSL analog-front-end (AFE) transmission circuit (first DSL AFE TX Circuit) 220 or a second DSL AFE transmission circuit (second DSL AFE TX Circuit) 230 according to a transmission selection parameter. Said transmission selector 210 could be a multiplexer or its equivalent while the transmission selection parameter could be generated by a controller (e.g. a digital signal processor (DSP) which is not shown) according to the type of the present DSL system. For instance, if the present DSL system is a first DSL system (e.g. an ADSL system), the transmission selection parameter will have the transmission selector 210 send the output signal to the first DSL AFE transmission circuit 220; similarly, if the present DSL system is a second DSL system (e.g. a VDSL system), the transmission selection parameter will have the transmission selector 210 send the output signal to the second DSL AFE transmission circuit 230; other instances could be derived in light of the above. The above-mentioned first DSL AFE transmission circuit 220 corresponds to the first DSL system (e.g. the ADSL system) for generating the fore-disclosed first DSL transmission signal according to the output signal. Such first DSL AFE transmission circuit 220 could be a known circuit (e.g. an ADSL AFE transmission Circuit) including a digital-to-analog converter (DAC) and a line driver. On the other hand, the above-mentioned second DSL AFE transmission circuit 230 corresponds to a second DSL system (e.g. the VDSL system) for generating the fore-disclosed second DSL transmission signal according to the output signal. Such second DSL AFE transmission circuit 220 could be another known circuit (e.g. a VDSL AFE transmission circuit) including a DAC and a line driver as well.

Please refer to FIG. 2 again. The reception circuit 130 includes: a first DSL AFE reception circuit (first DSL AFE RX Circuit) 240, a second DSL AFE reception circuit 250 and a reception selector 260. Said first DSL reception circuit 240 corresponds to the aforementioned first DSL system for generating the first DSL reception signal according to the DSL reception signal, and could be a known DSL AFE reception circuit (e.g. an ADSL AFE reception circuit) including a low noise amplifier (LNA) and an analog-to-digital converter (ADC). Said second DSL reception circuit 250 corresponds to the aforementioned second DSL system for generating the second DSL reception signal according to the DSL reception signal, and could be another known DSL AFE reception circuit (e.g. a VDSL AFE reception circuit) including an LNA and an ADC as well. Said reception selector 260 is for receiving the first and second DSL reception signals and outputting one of them as the fore-mentioned input signal in accordance with a reception selection parameter. This reception selector 260 could be a multiplexer or its equivalent, and the reception selection parameter could be determined by the fore-disclosed control circuit in light of the type of the present DSL system. For instance, if the present DSL system is the first DSL system, the reception selection parameter has the reception selector 260 output the first DSL reception signal as the input signal; if the present DSL system is the second DSL system, the reception selection parameter has the reception selector 260 output the second DSL reception signal as the input signal; more examples could be derived in the same or a similar way.

Figure 3:
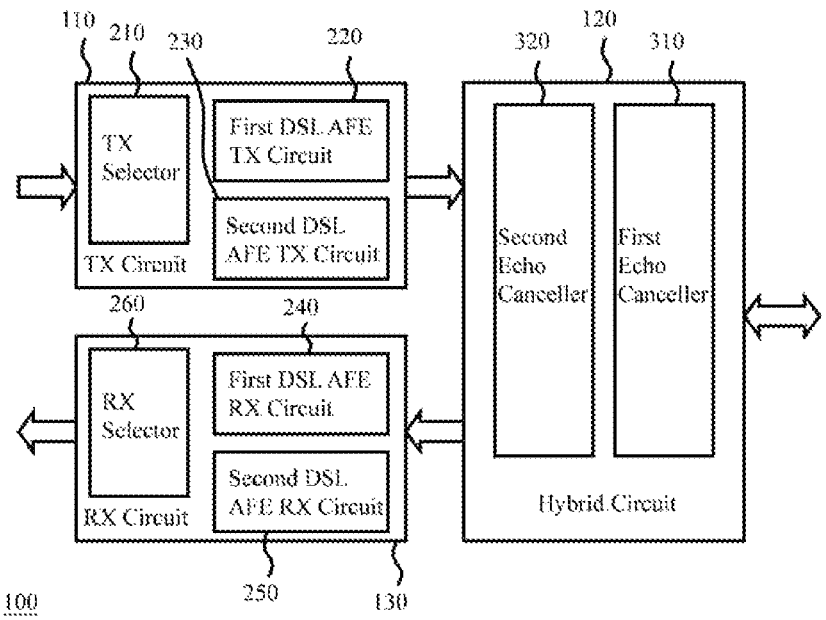
FIG. 3 illustrates the implementation detail of the hybrid circuit of FIG. 2.

Please refer to FIG. 3 which illustrates an implementation example of the hybrid circuit 120 of FIG. 2. As shown in FIG. 3, the hybrid circuit 120 is coupled with the transmission circuit 110 and the reception circuit 130, and includes: a first echo canceller 310 and a second echo canceller 320. Said first echo canceller 310 is composed of one or more passive components to carry out a first echo cancellation on the aforementioned line reception signal; the passive components could be a configuration with a constant resistive impedance and a passive filter, and could be used in accordance with general DSL features. For instance, the constant impedance could be chosen based on a general ADSL line impedance to realize a preliminary impedance-matching effect, which means that the echo noise due to the aforementioned line transmission signal can be eliminated roughly. Besides, the passive filter could be a high-pass filter to filter out the echo noise of low frequency. On the other hand, said second echo canceller 320 includes one or more active components to carry out a first DSL echo cancellation (e.g. an ADSL echo cancellation) or a second DSL echo cancellation (e.g. a VDSL echo cancellation) according to an echo cancellation selection parameter (e.g. the aforementioned transmission selection parameter indicating the type of the present DSL system), and/or to carry out a second echo cancellation according to a line impedance detection result or an echo cancellation amount estimation result. For instance, the second echo canceller 320 may include several active filters; one of the active filters is to carry out the first or second DSL echo cancellation by modifying its frequency band in accordance with the echo cancellation selection parameter (e.g. the type of the present DSL system) while another of the active filters is to carry out the second echo cancellation by determining a corresponding impedance according to the line impedance detection result or the echo cancellation amount estimation result. In this embodiment, the echo cancellation estimation result indicates a predetermined or the maximum echo cancellation amount.

Please note that in the present embodiment the first echo canceller 310 is composed of one or more passive components, which implies that the echo canceller 310 is non-adjustable. However, this is not a limitation to the present invention; people of ordinary skill in the art can add an active component to the echo canceller 310 or use an active component instead of the passive component(s) according to the design specification or requirement to thereby make the first echo canceller 310 adjustable. On the other hand, the second echo canceller 320 includes one or more active components and is therefore dynamically adjustable. Similarly, besides the active component(s), the second echo canceller 320 can further include one or more passive components to assist its active component(s) in echo cancellation. Briefly, those of ordinary skill in the art can modify the second echo canceller 320 in accordance with their demand and resource. Since the disclosure of this specification plus common knowledge is enough for one to appreciate how to use passive and/or active components to make the first echo canceller 310 and the second echo canceller 320, redundant description is therefore omitted.

Figure 4:
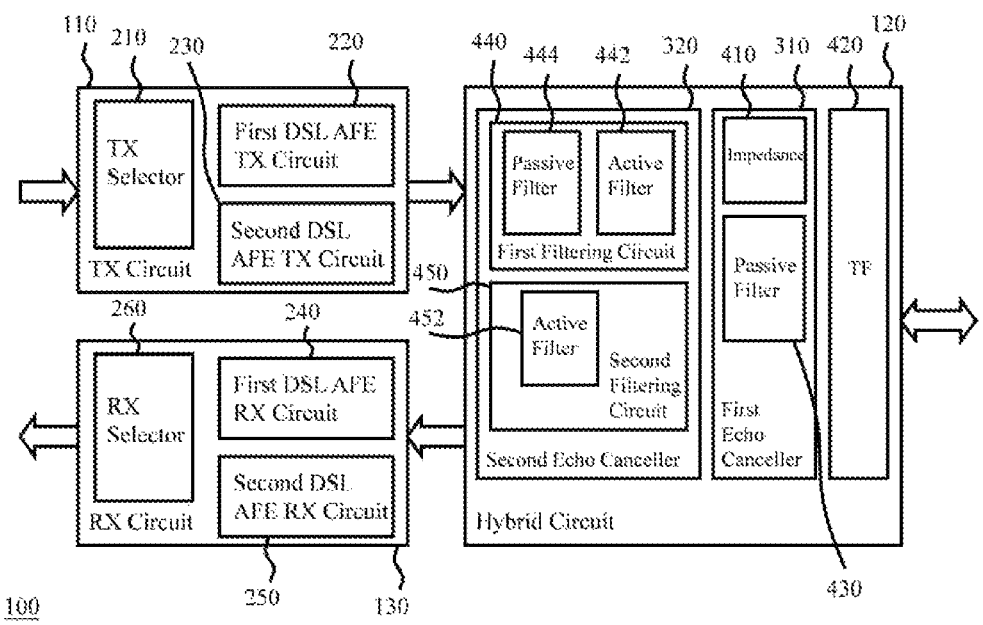
FIG. 4 illustrates the implementation detail of the first and second echo cancellers of FIG. 3.

Please refer to FIG. 4 which illustrates the implementation detail of the first and second echo cancellers 310, 320 of FIG. 3. As shown in FIG. 4, the first echo canceller 310 includes: at least one impedance 410 to provide a preliminary impedance-matching effect and form a bridge configuration with a secondary winding of a transformer (TF) 420 for echo cancellation in which the transformer 420 could be an integrated part of the hybrid circuit 120 or a separated part outside the hybrid circuit 120; and at least one passive filter 430, coupled with the at least one impedance 410, to carry out a predetermined filtering function (e.g. a high-pass filtering function) for echo cancellation. Besides, the second echo canceller 320 includes a first filtering circuit 440 and a second filtering circuit 450. Said first filtering circuit 440 is to execute the first DSL echo cancellation if the echo cancellation selection parameter indicates the present DSL system corresponding to the first DSL system (e.g. an ADSL system), and to execute the second DSL echo cancellation if the echo cancellation selection parameter indicates the present DSL system corresponding to the second DSL system (e.g. a VDSL system). More specifically, if the present DSL system is the first DSL system, said first filtering circuit 440 will adopt first parameter setting to execute the first DSL echo cancellation; and if the present DSL system is the second DSL system, said first filtering circuit 440 will adopt second parameter setting to execute the second DSL echo cancellation, wherein the first parameter setting is determined by the signal transfer function of the echo path of the first DSL system while the second parameter setting is determined by the signal transfer function of the echo path of the second DSL system. The mentioned signal transfer function is the function of signal relation between the signal at the start and the signal at the end, and can be determined by an analysis circuit (e.g. the aforementioned control circuit). Furthermore, the first filtering circuit 440 includes at least one active filter 442 and at least one passive filter 444 in which the active filter 442 is to do filtration according to the first or second parameter settings and the passive filter 444 is to assist the active filter 442 in filtration. Besides, the aforementioned second filtering circuit 450 is to execute the second echo cancellation according to the aforementioned line impedance detection result or the echo cancellation amount estimation result. Said line impedance detection result or echo cancellation amount estimation result is related to the type and loop distance of the present DSL system, and the loop distance includes the distance of a bridging path of main loop of signal transmission. Moreover, the second filtering circuit 450 includes at least one active filter 452 to perform adjustment in accordance with the aforementioned line impedance detection result or echo cancellation amount estimation result, so as to carry out the second echo cancellation. Please note that one can eliminate the passive filter 444 on his/her consideration provided that the corresponding implementation is still applicable.

Figure 5:
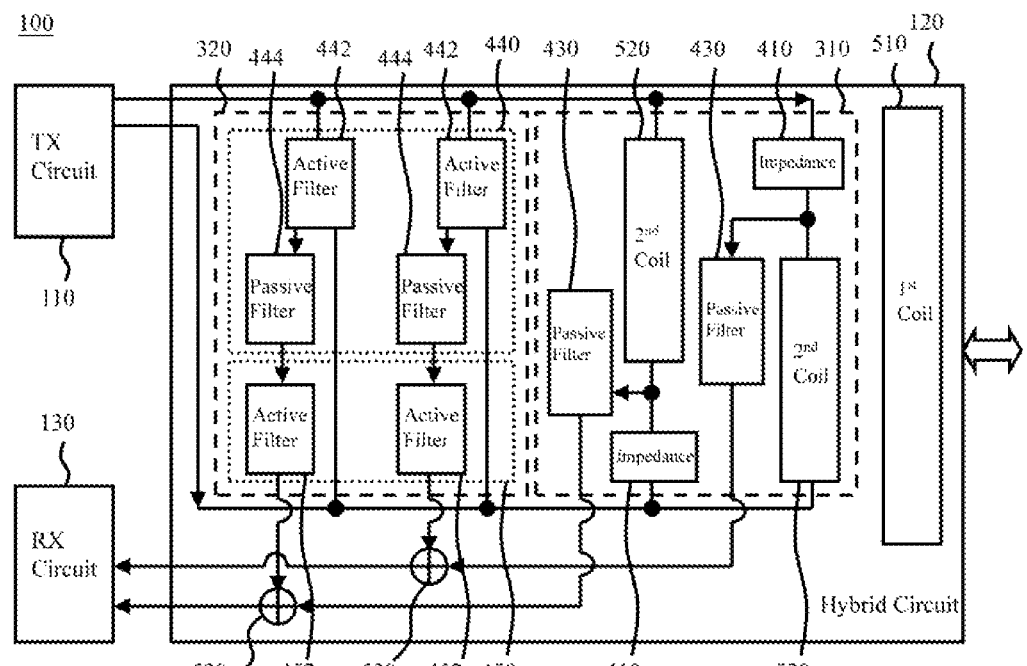
FIG. 5 illustrates the further detail of the hybrid circuit of FIG. 4.

Please refer to FIG. 5 which illustrates the further detail of the hybrid circuit 120 of FIG. 4. People of ordinary skill in the art may understand the present invention much better through FIG. 5, but are still free to make equivalent changes. As shown in FIG. 5, most of the circuits therein has been illustrated in FIG. 4; only the transformer 420 is subdivided into circuits with a primary coil ($1^{st}$ Coil) 510 and secondary coils ($2^{nd}$ Coil) 520, and two adders 530 are included to add up a first echo cancellation signal from the first echo canceller 310 and a second echo cancellation signal from the second echo canceller 320 to thereby provide the aforementioned DSL reception signal. Since the figs. and the fore description are enough for those of ordinary skill in the art to appreciate the operation of the circuits of FIG. 5, repeated and redundant description will be omitted to save paragraphs.

In light of the above, under the assistance of the aforementioned control circuit of its equivalent, the second echo canceller 320 will be aware of the type of the present DSL system, and is capable of performing line impedance detection or echo cancellation amount estimation with or through other known circuits to obtain the line impedance detection result or the echo cancellation amount estimation result. Since the assistant means of the control circuit and the related detection are well known in this field, the further detail will be omitted provided that such omission has nothing to do with the must content of the present invention.

Figure 6:
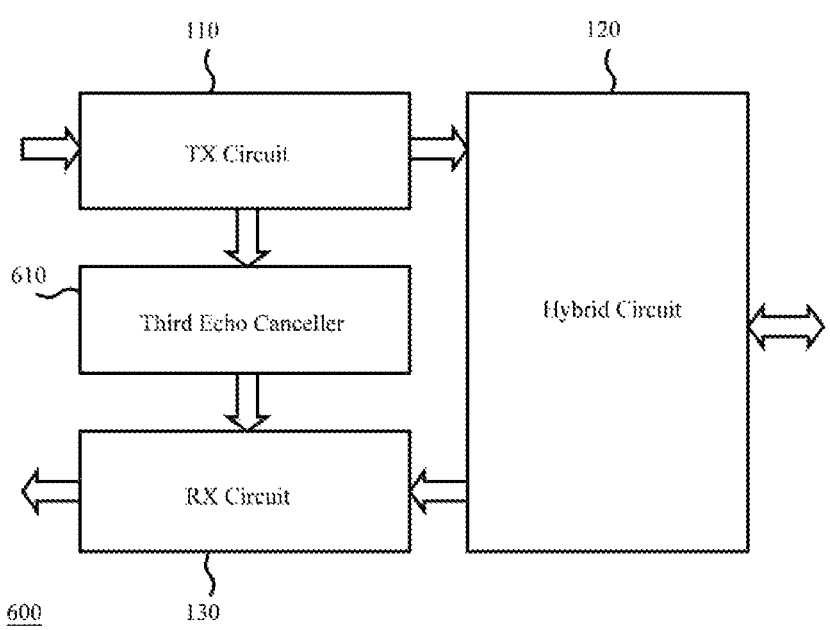
FIG. 6 illustrates another embodiment of the DSL transceiver of the present invention.

Please refer to FIG. 6 which illustrates another embodiment of the DSL transceiver of the present invention. This embodiment is distinct from the embodiment of FIG. 1 in the transceiver 600 further comprising: a third echo canceller 610, coupled between the aforementioned transmission circuit 110 and the reception circuit 130, to carry out a third echo cancellation on the input signal. The third echo canceller 610 includes at least one adjustable active filter which is able to eliminate the echo noise escaping from the aforementioned hybrid circuit 120. In other words, since the hybrid circuit 120 is not perfect, there might be residual echo noise that will cause inter-symbol interference (ISI) to the reception signal, which will diminish the signal-to-noise ratio (SNR) of the reception end. However, with the installation of the third echo canceller 610, said residual echo noise can be reduced effectively and thus the ISI caused by the echo noise can be restricted to a very low level. In the present embodiment, under the control of the control circuit or its equivalent, the adaptive adjustment to the third echo canceller 610 could be realized by sending a specific training sequence and detecting the residual echo noise of the training sequence, which means that the control circuit or its equivalent can adjust the operation of the third echo canceller 610 in accordance with the self-generated training sequence and the detection result of the residual echo noise, so that the noise could be decreased through the adjustment. In fact, the adjustment to the forementioned second echo canceller 320 could be done in the same or a similar way. However, other adjustment methods (e.g. a method to analyze the variation of SNR or bit error rate (BER) step by step for finding out the optimal setting) could be adopted by this invention provided that the corresponding implementation is still applicable. Please note that the implementation details of FIG. 2 to FIG. 5 could be applied to the transceiver 600 of FIG. 6, and since the fore-disclosed content is enough for one of ordinary skill in the art to adopt those details, repeated or redundant description will therefore be omitted.

In addition to the above-disclosed DSL transceiver, the present invention also discloses a DSL communication method that is able to support a variety of DSL systems (e.g. an ADSL system and a VDSL system) and could be carried out by the DSL transceiver of the present invention or its equivalent. Please refer to FIG. 7 which illustrates an embodiment of the DSL communication method. This embodiment comprises the following steps:

Step S710: generating a first DSL transmission signal or a second DSL transmission signal according to an output signal. In this embodiment, step S710 could be executed by the transmission circuit 110 of FIG. 1 or FIG. 6 or the equivalent thereof, and is able to generate the first DSL transmission signal (e.g. an ADSL transmission signal) or the second DSL transmission signal (e.g. a VDSL signal) based on a transmission selection parameter which is determined by the type of the present DSL system.

Step S720: generating a line transmission signal according to the first or second DSL transmission signal. In the present embodiment, step S720 could be executed by the hybrid circuit 120 of FIG. 1 or FIG. 6 or its equivalent.

Step S730: receiving a line reception signal and carrying out a constant first echo cancellation on the line reception signal to thereby generate a first echo cancellation signal. In this embodiment, step S730 could be executed by the hybrid circuit 120 of FIG. 1 or FIG. 6 or the equivalent thereof.

Step S740: carrying out a first DSL echo cancellation or a second DSL echo cancellation on the line reception signal according to an echo cancellation selection parameter (e.g. the aforementioned transmission selection parameter indicating the type of the preset DSL system) and/or carrying out a second echo cancellation on the line reception signal according to a line impedance detection result or an echo cancellation amount estimation result, so as to generate a second echo cancellation signal. In this embodiment, step S740 could be executed by the hybrid circuit 120 of FIG. 1 or FIG. 6 or its equivalent.

Step S750: generating a DSL reception signal according to the first and second echo cancellation signals. In the present embodiment, step S750 could be done by the hybrid circuit 120 of FIG. 1 or FIG. 6 or the equivalent thereof.

Step S760: generating a first DSL reception signal or a second DSL reception signal according to the DSL reception signal, and outputting the first DSL reception signal or the second DSL reception signal as an input signal. In this embodiment, step S760 could be executed by the reception circuit 130 of FIG. 1 or FIG. 6 or its equivalent, and is able to generate the first DSL reception signal (e.g. an ADSL reception signal) or the second DSL reception signal (e.g. a VDSL reception signal) according to a reception selection parameter which could be determined by the type of the present DSL system.

Besides the above-mentioned steps, the present embodiment may further comprise the following step: carrying out an adjustable third echo cancellation on the input signal to eliminate the residual echo noise. This step could be executed by the echo canceller 610 of FIG. 6 and the related description has been well described.

Figure 7:
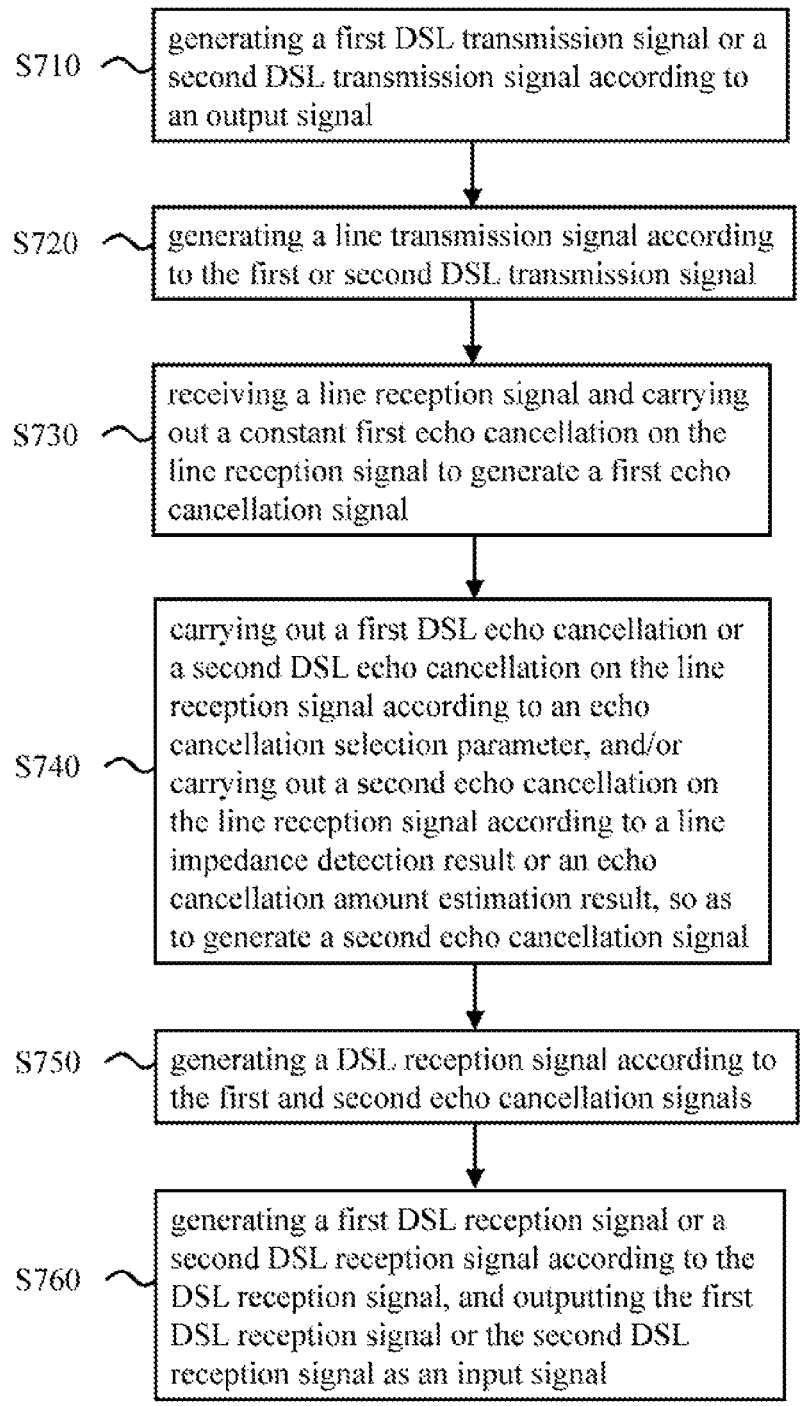
FIG. 7 illustrates an embodiment of the DSL communication method of the present invention.

Please note that people of ordinary skill in the art can appreciate the detail and implementation options of the communication method of FIG. 7 through referring to the foredescribed device invention of FIG. 1 to FIG. 6, and therefore redundant and unnecessary description is omitted. Please also note that the steps of the method invention are not restricted to any specific order unless any step indicates or implies an execution sequence; of course, the corresponding implementation of the method with a modified step order has to remain applicable.

To sum up, the transceiver and communication method of DSL include one or more of the following advantages: supporting a variety of DSL systems, which benefits the application flexibility and production cost; executing echo cancellation in light of the loop distance and the type of DSL system, which improves the echo cancellation performance; and eliminating the residual echo noise escaping from the hybrid circuit, which makes the reception end free from the ISI of the echo noise and increases the SNR of the reception end. Briefly, the present invention not only improves the application flexibility, but also improves the echo cancellation performance through multiple echo cancellation stages.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A transceiver of digital subscriber line (DSL) capable of supporting a variety of DSL systems, comprising:
   a transmission circuit including:
      a transmission selector to receive an output signal and provide the output signal for a first DSL analog-front-end transmission circuit or a second DSL analog-front-end transmission circuit according to a transmission selection parameter;
      the first DSL analog-front-end transmission circuit corresponding to a first DSL system to generate a first DSL transmission signal according to the output signal; and
      the second DSL analog-front-end transmission circuit corresponding to a second DSL system to generate a second DSL transmission signal according to the output signal;
   a hybrid circuit, coupled with the transmission circuit, to generate a line transmission signal according to the first DSL transmission signal or the second DSL transmission signal and generate a DSL reception signal according to a line reception signal, including:
      a first echo canceller to carry out a first echo cancellation on the line reception signal; and
      a second echo canceller to carry out a first DSL echo cancellation or a second DSL echo cancellation on the line reception signal according to an echo cancellation selection parameter, including:
         a first filtering circuit to carry out the first DSL echo cancellation if the echo cancellation selection parameter indicates the first DSL system, and carry out the second DSL echo cancellation if the echo cancellation selection parameter indicates the second DSL system; and
         a second filtering circuit to carry out a second echo cancellation according to a line impedance detection result or an echo cancellation amount estimation result; and
   a reception circuit, coupled with the hybrid circuit, including:
      a first DSL analog-front-end reception circuit corresponding to the first DSL system to generate a first DSL reception signal according to the DSL reception signal;
      a second DSL analog-front-end reception circuit corresponding to the second DSL system to generate a second DSL reception signal according to the DSL reception signal; and
      a reception selector to output the first DSL reception signal or the second DSL reception signal as an input signal according to a reception selection parameter.

2. The transceiver of DSL of claim 1, wherein the first DSL system is an ADSL (Asymmetric Digital Subscriber Line) system and the second DSL system is a VDSL (Very-high-data-rate Digital Subscriber Line) system.

3. The transceiver of DSL of claim 1, wherein the second echo canceller is further to carry out a second echo cancellation on the line reception signal according to a line impedance detection result or an echo cancellation amount estimation result.

4. The transceiver of DSL of claim 1, wherein the first echo canceller is un-adjustable while the second echo canceller is adjustable.

5. The transceiver of DSL of claim 1, further comprises:
   a third echo canceller, coupled between the transmission circuit and the reception circuit, to carry out a third echo cancellation on the input signal.

6. The transceiver of DSL of claim 5, wherein the third echo canceller is adjustable.

7. The transceiver of DSL of claim 1, wherein the first echo canceller comprises:
   at least one impedance to provide an impedance-matching effect and form a bridge configuration with a secondary winding of a transformer for echo cancellation; and
   at least one passive filter, coupled with the at least one impedance, to carry out a predetermined filtering function for echo cancellation.

8. The transceiver of DSL of claim 1, wherein the first filtering circuit includes at least one active filter and at least one passive filter while the second filtering circuit includes at least one active filter.

9. The transceiver of DSL of claim 1, further comprises:
   a third echo canceller, coupled between the transmission circuit and the reception circuit, to carry out a third echo cancellation on the input signal.

10. The transceiver of DSL of claim 9, wherein the third echo canceller is adjustable.

11. A transceiver of digital subscriber line (DSL) capable of supporting a variety of DSL systems, comprising:
    a transmission circuit to generate a first DSL transmission signal or a second DSL transmission signal according to an output signal;
    a reception circuit to generate a first DSL reception signal or a second DSL reception signal according to a DSL reception signal, and output the first or second DSL reception signal as an input signal; and
    a hybrid circuit which is coupled with the transmission circuit and the reception circuit to generate a line transmission signal according to the first DSL transmission signal or the second DSL transmission signal and generate the DSL reception signal according to a line reception signal, comprising:
       a first echo canceller to carry out a first echo cancellation on the line reception signal; and a second echo canceller to carry out a first DSL echo cancellation or a second DSL echo cancellation on the line reception signal according to a present DSL type, and/or carry out a second echo cancellation on the line reception signal according to a line impedance detection result or an echo cancellation amount estimation result, and the second echo canceller including:
a first filtering circuit to carry out the first DSL echo cancellation if the present DSL type corresponds to a first DSL system, and carry out the second DSL echo cancellation if the present DSL type corresponds to a second DSL system; and
a second filtering circuit to carry out the second echo cancellation according to the line impedance detection result or the echo cancellation amount estimation result.

12. The transceiver of DSL of claim 11, further comprising:
a third echo canceller, which includes an active filter and is coupled between the transmission circuit and the reception circuit, to carry out a third echo cancellation on the input signal.

13. The transceiver of DSL of claim 11, wherein the first echo canceller is un-adjustable while the second echo canceller is adjustable.

14. The transceiver of DSL of claim 11, wherein the first echo canceller includes:
at least one impedance to provide an impedance-matching effect and form a bridge configuration with a secondary winding of a transformer for echo cancellation; and
at least one passive filter, coupled with the at least one impedance, to carry out a predetermined filtering function for echo cancellation.

15. The transceiver of DSL of claim 11, wherein the transmission circuit is to generate the first DSL transmission signal or the second DSL transmission signal under the control of a transmission selection parameter, and the reception circuit is to output the first DSL reception signal or the second DSL reception signal as the input signal under the control of a reception selection parameter.

16. The transceiver of DSL of claim 11, wherein the first DSL transmission signal and the first DSL reception signal correspond to an ADSL (Asymmetric DSL) system while the second DSL transmission signal and the second DSL reception signal correspond to a VDSL (Very-high-data-rate DSL) system.

17. A communication method of digital subscriber line (DSL) capable of supporting a variety of DSL systems and being carried out by a DSL transceiver, comprising the following steps:
generating a first DSL transmission signal according to an output signal if a transmission selection parameter indicates a first DSL system, and generating a second DSL transmission signal according to the output signal if the transmission selection parameter indicates a second DSL system;
generating a line transmission signal according to the first or second DSL transmission signal;
receiving a line reception signal and carrying out a constant first echo cancellation on the line reception signal to thereby generate a first echo cancellation signal;
carrying out a first DSL echo cancellation or a second DSL echo cancellation on the line reception signal according to a present DSL type and/or carrying out a second echo cancellation on the line reception signal according to a line impedance detection result or an echo cancellation amount estimation result, so as to generate a second echo cancellation signal, while the step of generating the second echo cancellation signal is capable of:
carrying out the first DSL echo cancellation if the present DSL type corresponds to a first DSL system, and carrying out the second DSL echo cancellation if the present DSL type corresponds to a second DSL system; and
carrying out the second echo cancellation according to the line impedance detection result or the echo cancellation amount estimation result;
generating a DSL reception signal according to the first and second echo cancellation signals; and
generating a first DSL reception signal or a second DSL reception signal according to the DSL reception signal, and outputting the first DSL reception signal or the second DSL reception signal as an input signal.

* * * * *